United States Patent
Legault et al.

(10) Patent No.: US 11,372,996 B1
(45) Date of Patent: *Jun. 28, 2022

(54) VARIABLE DOMAIN RESOURCE DATA SECURITY FOR DATA PROCESSING SYSTEMS

(71) Applicant: Versata Development Group, Inc., Austin, TX (US)

(72) Inventors: Jacy M. Legault, Austin, TX (US); Jon Loyens, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/789,056

(22) Filed: Feb. 12, 2020

Related U.S. Application Data (63) Continuation of application No. 16/012,628, filed on Jun. 19, 2018, now Pat. No. 10,579,815, which is a
(Continued)

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G11C 7/00 | (2006.01) |
| G06F 21/62 | (2013.01) |

(Continued)

(52) U.S. Cl.
CPC .......... G06F 21/6218 (2013.01); G06F 21/44 (2013.01); G06F 21/604 (2013.01); H04L 63/105 (2013.01); *G06F 2221/2113* (2013.01)

(58) Field of Classification Search
CPC .... G06F 21/6218; G06F 21/604; G06F 21/44; G06F 2221/2113; H04L 63/105
See application file for complete search history.

(56) References Cited

U.S. PATENT DOCUMENTS

| | | | |
|---|---|---|---|
| 6,408,336 B1* | 6/2002 | Schneider | H04L 63/0218 |
| | | | 709/229 |
| 2004/0153171 A1* | 8/2004 | Brandt | G05B 15/02 |
| | | | 700/9 |

(Continued)

OTHER PUBLICATIONS

Notice of Allowance dated Oct. 23, 2019, filed in U.S. Appl. No. 16/012,628, pp. 1-12.
(Continued)

*Primary Examiner* — Trong H Nguyen (57) ABSTRACT

The variable domain data access control system and method described herein use the same variable domain to describe a data security model and a variable domain data model, such as a product configuration model. A variable domain is a set of resource data that can be described using a logical relationship data structure. The variable domain utilizes logical relationship expressions, such as a Boolean logic language, to define resource data in terms of parts, rules and/or attributes, and any other property that can be accessed for viewing, manipulation, or other purposes. The data security model represents an access control list (ACL) that includes security attributes as resource data and uses the same data structure and logical relationship expressions as an associated variable domain data model. An application,
(Continued)

such as a configuration engine, can be used to create controlled access to the variable domain data model using the data security model.

10 Claims, 10 Drawing Sheets

Related U.S. Application Data continuation of application No. 14/623,938, filed on Feb. 17, 2015, now Pat. No. 10,025,944, which is a continuation of application No. 14/084,270, filed on Nov. 19, 2013, now Pat. No. 9,043,899, which is a continuation of application No. 11/064,633, filed on Feb. 24, 2005, now Pat. No. 8,590,011.

(51) Int. Cl.
*H04L 9/40* (2022.01)
*G06F 21/44* (2013.01)
*G06F 21/60* (2013.01)

(56) References Cited

U.S. PATENT DOCUMENTS

2005/0086228 A1* 4/2005 Gross ................ G06F 21/6218
2006/0137019 A1* 6/2006 Dertinger ............ G06F 21/6218
726/27

OTHER PUBLICATIONS

Terminal Disclaimer dated Sep. 27, 2019, filed in U.S. Appl. No. 16/012,628, pp. 1-3.
Response to Non-Final Office Action dated Sep. 25, 2019, filed in U.S. Appl. No. 16/012,628, pp. 1-8.
Non-Final Rejection dated Mar. 25, 2019, filed in U.S. Appl. No. 16/012,628, pp. 1-13.
Response to Notice to File Corrected Application Papers—Filing Date Granted, filed in U.S. Appl. No. 16/012,628, pp. 1-4.
Preliminary Amendment dated Jun. 19, 2018, filed in U.S. Appl. No. 16/012,628, pp. 1-4.

* cited by examiner

| | | | |
|---|---|---|---|
| Desired business logic for security solution | | | |
| Principle 1 may edit rules and attributes of part F1 that mention B1 | | | |
| Principle 2 may edit rules and attributes of part F1 that mention A2 and B2 | | | |
| | | | |
| | | | |
| ACL | | | |
| Principle | Permission | Resource | Condition |
| Principle 1 | can edit | configuration model B | none |
| Principle 2 | can edit | configuration model C | none |

102 → Desired business logic for security solution
112 → Principle row

104 — Configuration Model

| Part | Rule or Attribute | Part Combination (Properties) |
|---|---|---|
| F1 | Compatible With | A1 and B1 |
| F1 | Incompatible With | A1 and B2 |
| F1 | Compatible With | A2 |

| | | |
|---|---|---|
| Part Family | A, B, F | |
| Parts | A1,A2 | |
| | B1,B2 | |
| | F1,F2 | |

106 — Configuration Model

| Part | Rule or Attribute | Part Combination (Properties) |
|---|---|---|
| F1 | Compatible With | A1 and B1 |

| | | |
|---|---|---|
| Part Family | A, B, F | |
| Parts | A1,A2 | |
| | B1,B2 | |
| | F1,F2 | |

108 — Configuration Model

| Part | Rule or Attribute | Part Combination (Properties) |
|---|---|---|
| F1 | Compatible With | A2 and B2 |

| | | |
|---|---|---|
| Part Family | A, B, F | |
| Parts | A1,A2 | |
| | B1,B2 | |
| | F1,F2 | |

110 — Configuration Model

| Part | Rule or Attribute | Part Combination (Properties) |
|---|---|---|
| F1 | Incompatible With | A1 and B2 |
| F1 | Compatible With | A2 and B1 |

| | | |
|---|---|---|
| Part Family | A, B, F | |
| Parts | A1,A2 | |
| | B1,B2 | |
| | F1,F2 | |

*Figure 1B (prior art)*

102 — Desired business logic for security solution
Principle 1 may edit rules and attributes of part F1 that mention B1
Principle 2 may edit rules and attributes of part F1 that mention A2 and B2

204 — ACL

| Principle | Permission | Resource | Condition |
|---|---|---|---|
| Principle 1 | can edit | all rules and attributes for part F1 | S1 |
| Principle 2 | can edit | all rules and attributes for part F1 | S2 |

104 — Configuration Model

| Part | Rule or Attribute | Part Combination (Properties) |
|---|---|---|
| F1 | Compatible With | A1 and B1 |
| F1 | Incompatible With | A1 and B2 |
| F1 | Compatible With | A2 |

| Part Family | A, B, F |
|---|---|
| Parts | A1,A2 |
| | B1,B2 |
| | F1,F2 |

202 — Configuration Model

| Part | Rule or Attribute | Part Combination (Properties) |
|---|---|---|
| F1 | Compatible With | A1 and B1 and S1 |
| F1 | Incompatible With | A1 and B2 |
| F1 | Compatible With | A2 and B1 and S2 |
| F1 | Compatible With | A2 and B2 |

| Part Family | A, B, F, S |
|---|---|
| Parts | A1,A2 |
| | B1,B2 |
| | F1,F2 |
| | S1,S2 |

VARIABLE DOMAIN RESOURCE DATA SECURITY FOR DATA PROCESSING SYSTEMS

BACKGROUND OF THE INVENTION

Field of the Invention

The present invention relates in general to the field of information processing, and more specifically to a system and method for providing security for variable domain resource data in an electronic data processing system.

Description of the Related Art

Data security issues often exist at the forefront of technology challenges faced by entities that maintain, use, view, manipulate, and otherwise access data. Often entities desire to grant different levels of access to different subsets of data to different principals. For example, in a product configuration context, it may be desirable to allow some principals to access one set of data and allow others principals to access another set of data, and the data represents a single, data configuration space.

Prior to discussing conventional data security solutions, for reference purposes, this application uses the following definitions unless otherwise indicated:

Resource Data (also referred to as a "resource")
A resource data is data that can be viewed, manipulated, and otherwise accessed. Accessing the resource data can be controlled for security purposes. Examples of a resource data are: a file in a file system, a data element in an OLAP cube, and an attribute and/or rule for a specific combination of parts in a configuration model.

Principal
A principal is a virtual or physical entity that has controlled access to a resource data, defined by the access control list (ACL). A principal can be a single entity or a group of entities. Examples of a principal are: the principal of a file system, the processes or principal querying for data in an OLAP cube, and the maintenance principal of a configuration model.

Permission
A permission is the description of the type of access for which the principal is allowed, i.e. what the principal is allowed to do or not to do relative to the resource data. Examples of a permission are: the ability of a file system principal (principal) to delete a file (resource data) in a file system, the ability of the principal querying an OLAP cube to read a data element (resource data), and the ability of a maintenance principal (principal) to change an attribute for a combination of parts (resource data) in a configuration model Access Control List (ACL)
An ACL is an example of a control structure that provides secure access to resource data. The ACL defines what permission a principal has to a specific resource data or resource data. Examples of an ACL are: the statement that specifies that a specific principal (principal) can delete (permission) a specific file (resource data) in the file system, the statement that specifies that a specific principal in an OLAP query can read (permission) a specific data element (resource data), and the statement that specifies that a specific maintenance principal (principal) can change (permission) the attribute for a specific combination of parts (resource data).

Condition
A condition is a function that takes the properties of a resource data as inputs and returns a Boolean output (Yes/No). A condition can facilitate the definition of which resource data an ACL may apply.

Part
A part represents a single component from a larger, more complex system. Parts are combined in different ways to define different instances of the more complex system. For example, "V6 engine" or the exterior color "red" can be parts on a vehicle, and a specific hard disk drive can be a part on a computer.

Part Group
A part group, also called a group, represents a collection of related parts. For example, the "Engines" group might contain the parts "V6 engine" and "4 cylinder engine."

Attribute
An attribute represents a particular detail about a part or part group. Attributes describe details about the part or part group. A single part or part group can have many attributes. For example, the part "V6 engine" might have a price attribute of "$500." a weight attribute of "1,000 lbs" and a description attribute of "six cylinder gas engine." Also, an attribute for a given part or part group may change depending on context, meaning what other parts are present. For example, the price attribute for the "V6 engine" might be "$500" when the "XLT trim" part is present and "$800" when the "XL trim" part is present.

Configuration Model
A configuration model defines the compatibility relationships between the parts that comprise a specific type of system. It can be used to determine, for example, which parts are compatible with which other parts, and provide additional details about specific relationships. For example, a vehicle configuration model can indicate that "red" (a part) is the standard color feature for a specific vehicle, but that the color red is not compatible with "V6 engine" (a part). A configuration model also contains additional information needed to support specific queries about that system.

Conventional data security solutions fall into one of the following two categories:
1) Solutions where each resource data has its own ACL or series of ACLs that control access to it.
2) Solutions where there are many ACLs that control access to many resource data.

Solutions for applications with very simple security needs will usually fall into the first category. These applications are characterized by relatively few resource data, and these resource data may not have well defined properties. Each resource data has its own ACL that controls access to the resource data. The security solutions for these applications become slower and more difficult to manage when the number of resource data increases.

A large number of applications require a much more complex security solution. Applications in the second category can be characterized by a large or very large number of resource data that have well defined properties or domains. There are typically many ACL-to-resource data relationships. An example of a 1 ACL-to-many resource data relationship is an ACL that controls access to all row and columns in a database table. Another example is an ACL associated with a directory in a file system that also controls access to all files in that directory. An example of a many ACL-to-1 resource data relationship is a multi-level hierarchy of directories in a file system where a separate ACL exists for each directory in the hierarchy along with rules of inheritance that define how the many ACLs combine together to control access to a file.

As the number and complexity of the conditions and resource data increases, the conventional data security solutions become increasingly difficult to maintain, performance decreases, and the possibility of ill defined or overlapping conditions in ACLs increases, thereby necessitating a definition for conflict resolution process.

An application that points out the shortcoming of the two conventional data security solutions is product configuration. A resource data in a product configuration model is an attribute and/or rule for a part that that applies to a valid or invalid permutation of parts from one or more part groups (properties of the attribute or rule). The number of possible resource data in a configuration model can easily reach beyond 10^10 (10 part families with 10 parts in each family).

Existing security solutions for product configuration typically fall into one of the two categories discussed above.

Figure 1A:
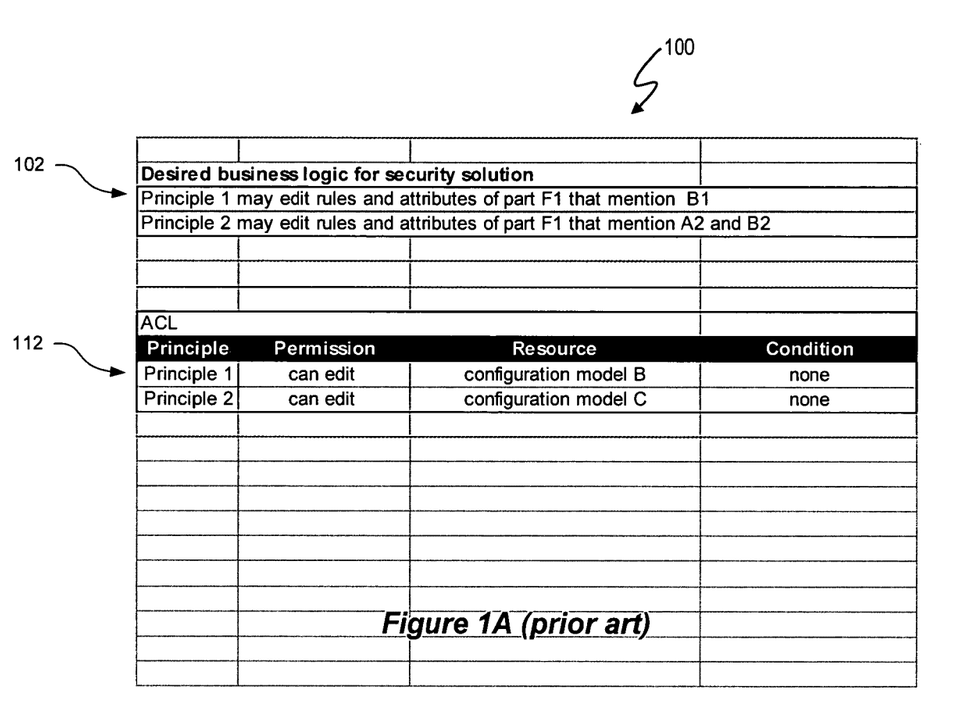
FIGS. 1A and 1B (labeled prior art) depict a data security solution 100 for a configuration model that divides a configuration model into many smaller, separate configuration models.
Figure 1B:
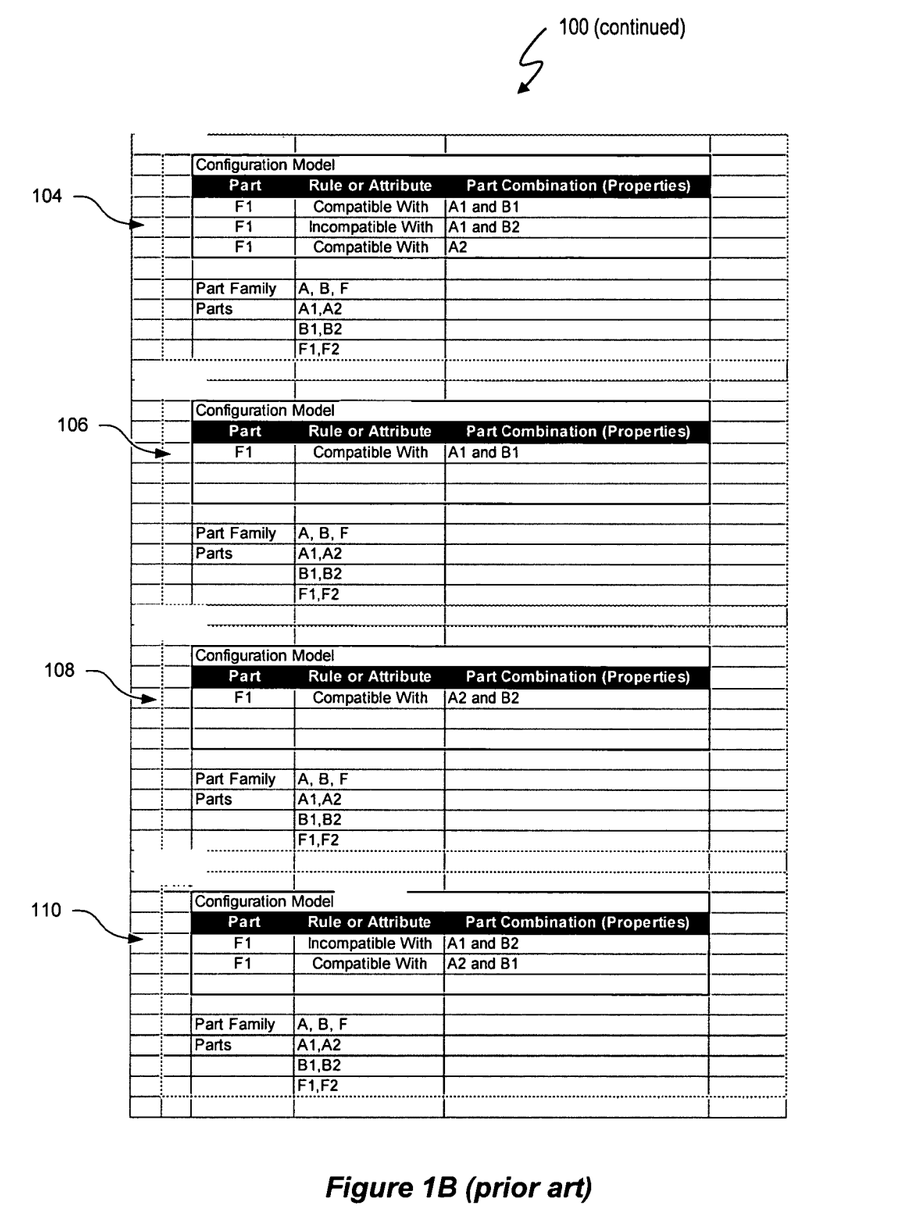

FIGS. 1A and 1B depict a data security solution 100 for a configuration model that divides a configuration model into many smaller, separate configuration models. The desired data access control business logic 102 for security solution 100 represents an example desired access control for principals 1 and 2 to the data (particularly the resource data) in configuration model 104. The data access control business logic 102 is "Principle 1 may edit rules and attributes of part F1 that mention B1" and "Principle 2 may edit rules and attributes of part F1 that mention A2 and B2." To achieve the desired security business logic 102, the comprehensive configuration model 104 is divided into many smaller, separate configuration models. 106, 108, and 110. Each of the configuration models 104, 106, 108, and 110 contain a Part, a Rule or Attribute, and a Part or Part Combination (also referred to as "Properties"). The part families represented are A, B, and F, and the parts in each part family are {A1, A2}, {B1, B2}, and {F1, F2}. The Rule or Attribute describes a logical relationship between a first part and another part or part combination. For example, the first part F is compatible with the combination of parts A1 and B1. Part F1 is incompatible with the combination of parts A1 and B2. Part F1 is compatible with part A2. Each of the smaller, sub-configuration models 106, 108, and 110 is then treated as a resource data. A principal is assigned permissions to each of the sub-configuration models 106, 108, and 110 by an ACL 112.

There are many problems with data security solution 100 in the context of a configuration application. The sub-configuration models 106, 108, and 110 need to be combined together before they can be processed by a configuration engine, which is a difficult task to perform manually and algorithmically. It is more difficult to manage and maintain separate sub-configuration models than one larger model. And finally, as the domain of the configuration model increases, the number of sub-configuration models will need to increase, making the task of managing the ACL 112 more difficult.

Figure 2:
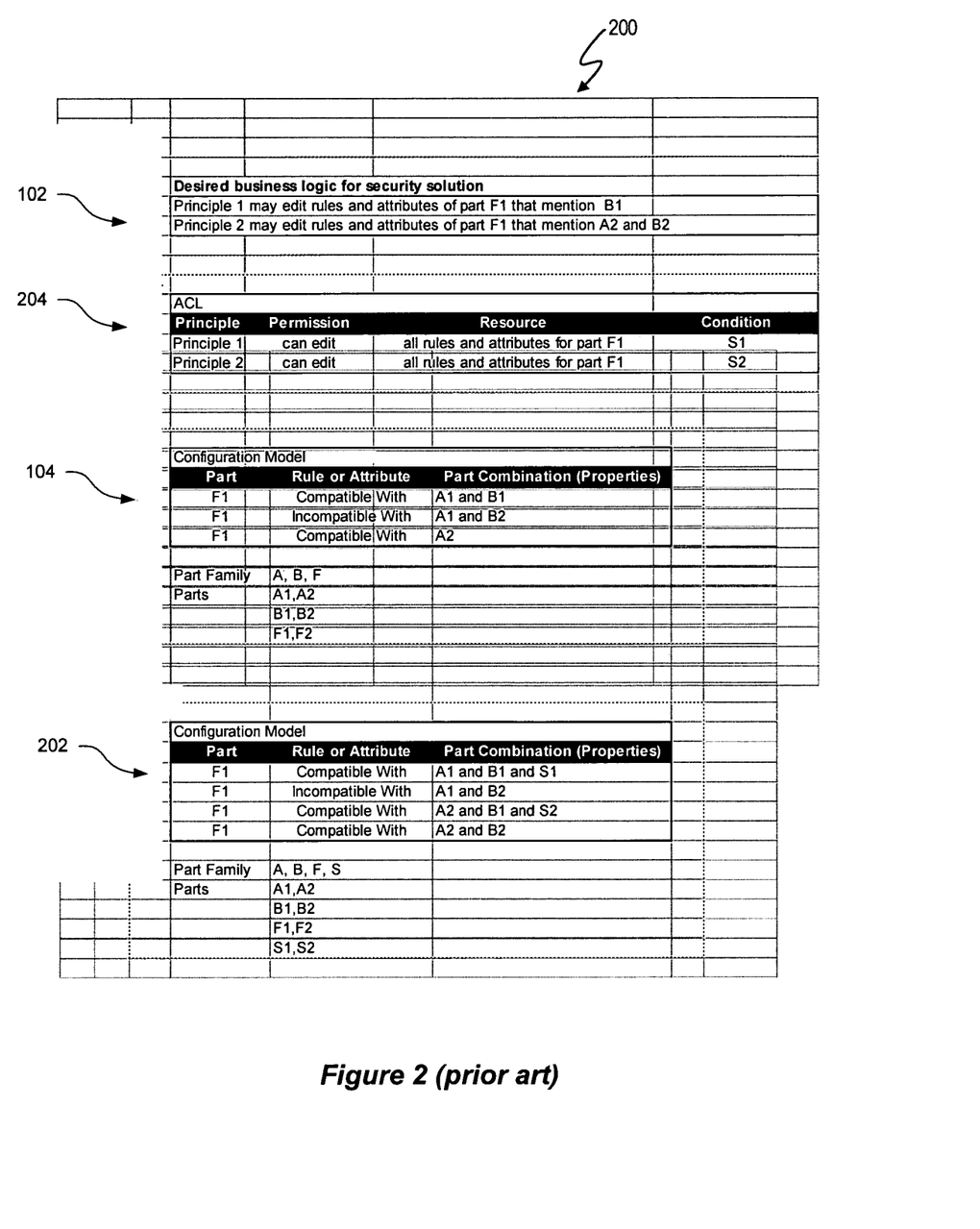
FIG. 2 (labeled prior art) depict a data security solution that adds "helper" part families to control access to various portions of data.

FIG. 2 depict a data security solution 200 that adds "helper" part families to control access to various portions of data. To achieve the desired security business logic 102, the comprehensive configuration model 104 is modified to add additional "helper" part families "S1" and "S2", as depicted in configuration model 202, to use as categories to associate with a set of resource data. These "helper" part families S1 and S2 do nothing but make it possible to categorize the resource data for use with conditions in the ACL 204. The ability to use conditions allows the ACL to define security for more than one configuration resource data at a time. Solution 200 is better than solution 100 because it does not require the configuration model 104 to be divided up into sub-configuration models. It is more scalable that solution 100 because multiple resource data can be secured with a fewer number of ACLs.

However, solution 200 has three major drawbacks. First, adding "helper" part families increases the complexity of the configuration model 104 by modifying the resource data in order to create security categories. This extra complexity increases storage and processing memory requirements and reduces processing performance. Second, mapping the helper parts so that the correct resource data can be addressed in the ACL 204 is difficult to set up and maintain. The right combination of helper parts must be associated with correct resource data. Third, it is possible to define conflicting ACLs.

Figure 3:
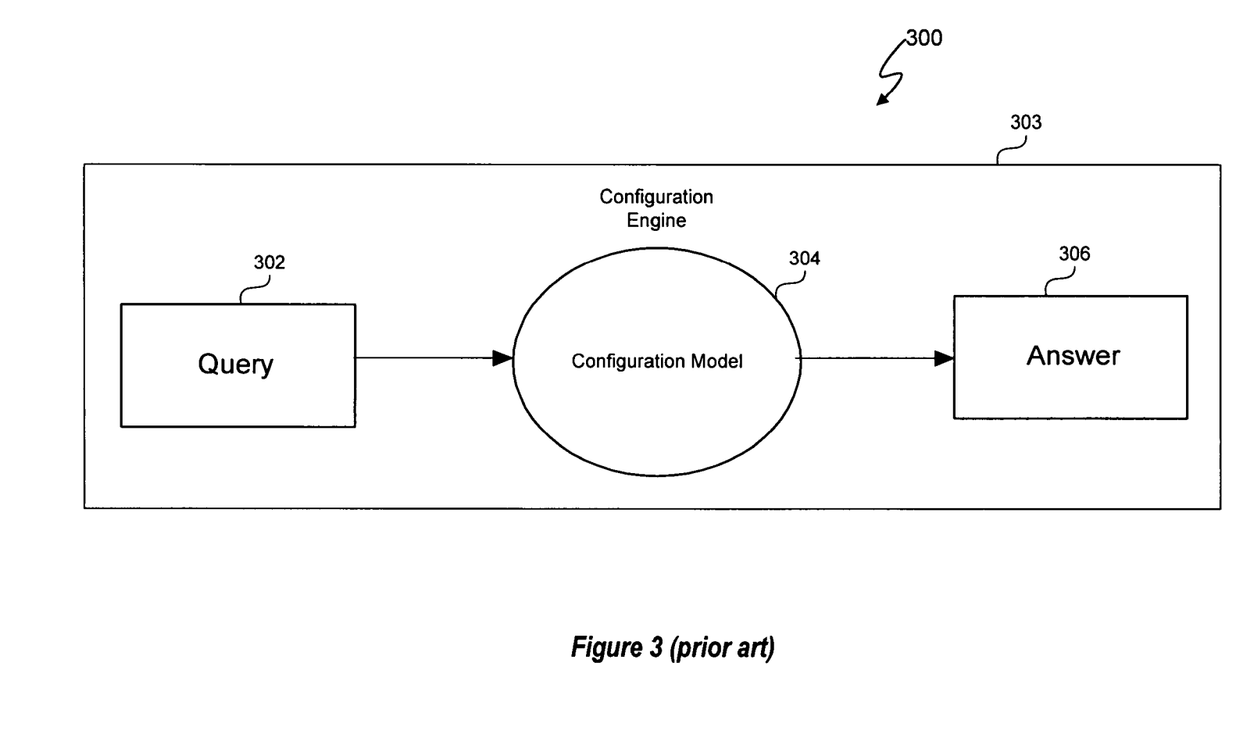
FIG. 3 (prior art) depicts a conventional product configuration process.
Figure 4:
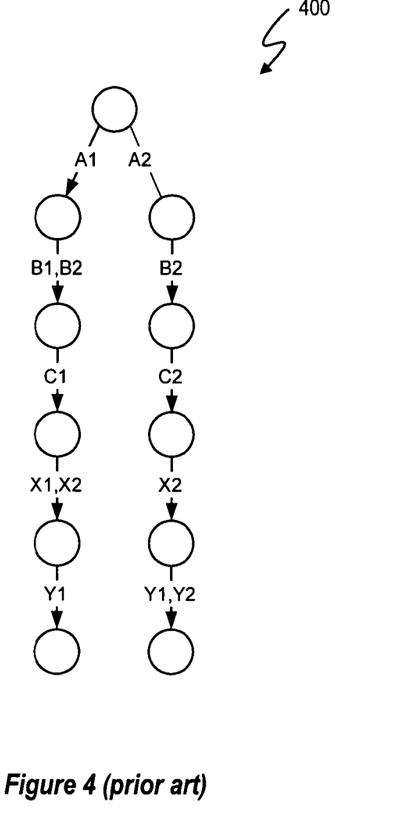
FIG. 4 (prior art) depicts a configuration model in graphical, tree based form.

Product configuration environments present many data security challenges. FIGS. 3 and 4 depict basic concepts of product configuration and the data involved with product configuration. Computer assisted product configuration continues to offer substantial benefits to a wide range of users and industries. FIG. 3 depicts a conventional product configuration process 300 performed by a configuration engine 303. The configuration process 300 represents one embodiment of an inference procedure. In one embodiment of a conventional inference procedure, configuration query 302 is formulated based on user configuration input, a configuration engine performs the configuration query 302 using a configuration model 304, and the configuration engine provides an answer 306 to the configuration query 302 based on the configuration query 302 and the contents of the configuration model 304. The answer 306 represents a particular response to the configuration query 302.

A configuration model 304 uses, for example, data, rules, and/or constraints (collectively referred to as "data") to define compatibility relationships between parts (also commonly referred to as "features") contained in a specific type of product. A product configuration is a set of parts that define a product. For example, a vehicle configuration containing the parts "V6 engine" and "red" represents a physical vehicle that has a red exterior and a V6 engine. A product can be a physical product such as a vehicle, computer, or any other product that consists of a number of configurable features such as an insurance product. Additionally, a product can also represent a service such as financial services, insurance services, or consulting services.

A configuration query (also referred to as a "query") is essentially a question that is asked about the parts, relationships, and attributes in a configuration model. The answer returned from a configuration query will depend on the data in the configuration model, the approach used for answering the question, and the specifics of the question itself. For example, one possible configuration query, translated to an English sentence, is the following: For the given configuration model, are the parts "red" and "V6 engine" compatible with each other? Another possible configuration query is the following: For the given configuration model, is the "V6 engine" part standard or optional when in the presence of the "XLT trim", "XL trim", "USA", and "Canada" parts, wherein "standard" and "optional" are attributes?

The configuration model 304 can be used to determine, for example, which parts are compatible with other parts, and provide additional details around specific relationships. For example, a vehicle configuration model can indicate that "red" (a part) is the standard feature from the color part group for a specific vehicle and "red" is not compatible with "V6 engine" (a part). Configuration model 304 may also contain additional information needed to support specific product related queries. Configuration models can be developed in any number of ways. U.S. Pat. No. 5,825,651 entitled "Method and Apparatus for Maintaining and Configuring Systems", inventors Gupta et al., and assigned to Trilogy Development Group, Inc., describes an example configuration engine and rules based configuration model. U.S. Pat. No. 5,825,651 (referred to herein as the "Gupta Patent") is incorporated herein by reference in its entirety. U.S. Pat. No. 5,515,524 entitled "Method and Apparatus for Configuring Systems", inventors John Lynch and David Franke, and assigned to Trilogy Development Group, Inc., describes another example configuration engine and constraint based configuration model. U.S. Pat. No. 5,515,524 (referred to herein as the "Lynch Patent") is also incorporated by reference in it entirety.

FIG. 4 depicts an example configuration model 400 of a product represented in a graphical, tree based form. The product can be configured to include part combinations A1, B1 or B2, C1, X1 or X2, and Y1 or configured to include part combinations A2, B2, C2, X2, and Y1 or Y2. The configuration model 400 includes rules to define these part relationships. Table 1 represents an example rule set, wherein "S" represents "standard" and "O" represents optional. Configuration model 400 represents a relatively non-complex configuration model. Actual configuration models for a single product can include hundreds of thousands or more parts, rules, and attributes.

TABLE 1

Example Configuration Rules for a Product

A1 S ALL
A2 O ALL
B1 S A1
B2 S A2
B2 O A1
C1 S A1
C2 S A2
X1 S C1
X2 S C2
X2 O C1
Y1 S C1
Y1 S C2
Y2 O C2

SUMMARY OF THE INVENTION

In one embodiment of the present invention, a method of providing controlled, electronic access to variable domain data stored in a data processing system includes receiving information from a principal that includes information identifying the principal. The method also includes performing one or more logical relationship operations on a data security model and a variable domain data model using security attributes of the data security model to determine a level of resource data access to be granted to the principal, wherein the data security model and the variable domain model share a common logical relationship data structure and granting the principal access to the resource data in accordance with the determined level of resource data access to be granted to the principal.

In another embodiment of the present invention, a data processing system to provide controlled, electronic access to variable domain data stored in a data processing system includes a processor and a storage medium coupled to the processor and having data encoded therein. The data includes processor executable code for:

receiving information from a principal that includes information identifying the principal;

performing one or more logical relationship operations on a data security model and a variable domain data model using security attributes of the data security model to determine a level of resource data access to be granted to the principal, wherein the data security model and the variable domain model share a common logical relationship data structure; and granting the principal access to the resource data in accordance with the determined level of resource data access to be granted to the principal.

In a further embodiment of the present invention, a computer storage medium comprising data embedded therein to cause a computer system to provide controlled, electronic access to variable domain data stored in a data processing system. The embedded data comprises processor executable code for:

receiving information from a principal that includes information identifying the principal;

performing one or more logical relationship operations on a data security model and a variable domain data model using security attributes of the data security model to determine a level of resource data access to be granted to the principal, wherein the data security model and the variable domain model share a common logical relationship data structure; and granting the principal access to the resource data in accordance with the determined level of resource data access to be granted to the principal.

In another embodiment of the present invention, a computer system to provide controlled, electronic access to variable domain data stored in a data processing system includes means for receiving information from a principal that includes information identifying the principal. The computer system also includes means for performing one or more logical relationship operations on a data security model and a variable domain data model using security attributes of the data security model to determine a level of resource data access to be granted to the principal, wherein the data security model and the variable domain model share a common logical relationship data structure and means for granting the principal access to the resource data in accordance with the determined level of resource data access to be granted to the principal.

In a further embodiment of the present invention, a method of defining a security data model used to provide controlled, electronic access to variable domain data stored in a data processing system includes storing security attributes in a logical relationship data structure used by an associated variable domain data model, wherein the security attributes are stored in a computer readable storage medium.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The variable domain data access control system and method described herein use the same variable domain to describe a data security model and a variable domain data model, such as a product configuration model. A variable domain is a set of resource data that can be described using a logical relationship data structure. An example of a variable domain is a set of part combinations described by attributes and/or rules in a configuration model. A variable domain could also be a set of all data elements in an on-line analytical processing (OLAP) data hyper-cube. The variable domain utilizes logical relationship expressions, such as a Boolean logic language, to define resource data in terms of parts, rules and/or attributes, and any other property that can be accessed for viewing, manipulation, or other purposes. The data security model represents an access control list (ACL) that includes security attributes as resource data and uses the same data structure and logical relationship expressions (collectively referred to as a "logical relationship data structure") as an associated variable domain data model. Accordingly, the data security model can be seamlessly integrated with the associated variable domain data model. Additionally, the same application used to process the variable data model can be used to process the data security model using logical relationship operations. One embodiment of a logical relationship operation is determining the intersection of one or more configuration spaces. Thus, for example, the application, such as a configuration engine, can be used to view, manipulate, and determine cross-products (e.g. configuration space intersections) between the security data model and the variable domain data model to create controlled access to the variable domain data model. The data display capabilities of the application allow a principal to visualize each principal's level of access to resource data in the variable domain data model.

Embodiments of the variable domain data access control system and method:
1) can scale seamlessly with the number and complexity of resource data in the variable domain data model.
2) The data security model does not require additional complexity to be added to the resource data of the variable domain data model.
3) The same algorithms used to process resource data of a variable data domain model can be used to process or execute the data security model.
4) The same maintenance methods and user interfaces used to maintain the resource data of the variable domain data model can be used to maintain the data security model. The procedure for describing a condition for the data security model is virtually the same as defining a new resource data in the variable domain data model.
5) The same methods used to prevent overlapping resource data can be used to prevent conflicts within the data security model.
6) The type of controlled access and the type of data, such as resource data, accessible to a principal can be specified by the data security model.

Figure 5:
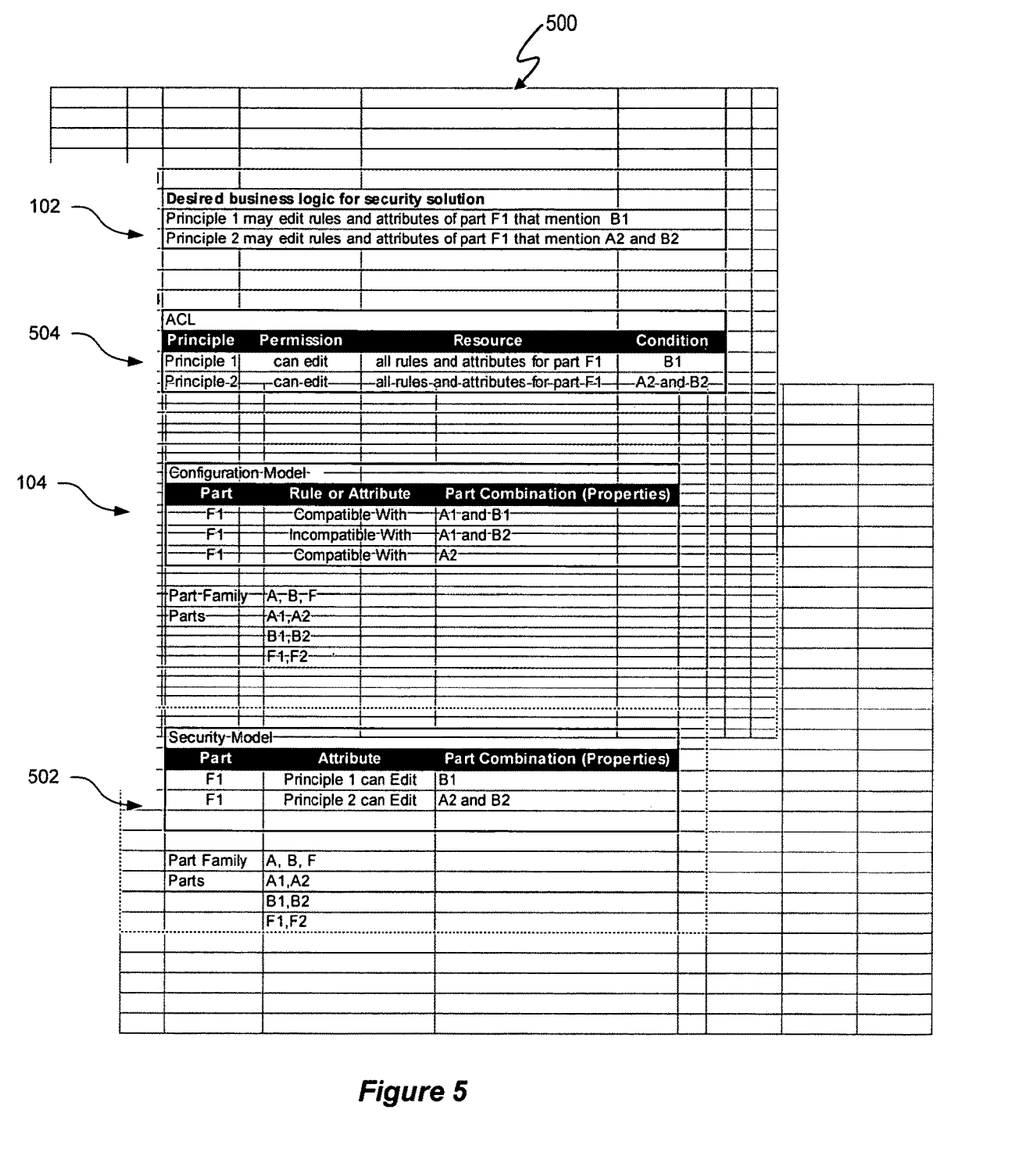
FIG. 5 depicts a variable domain data access control system.
Figure 8:
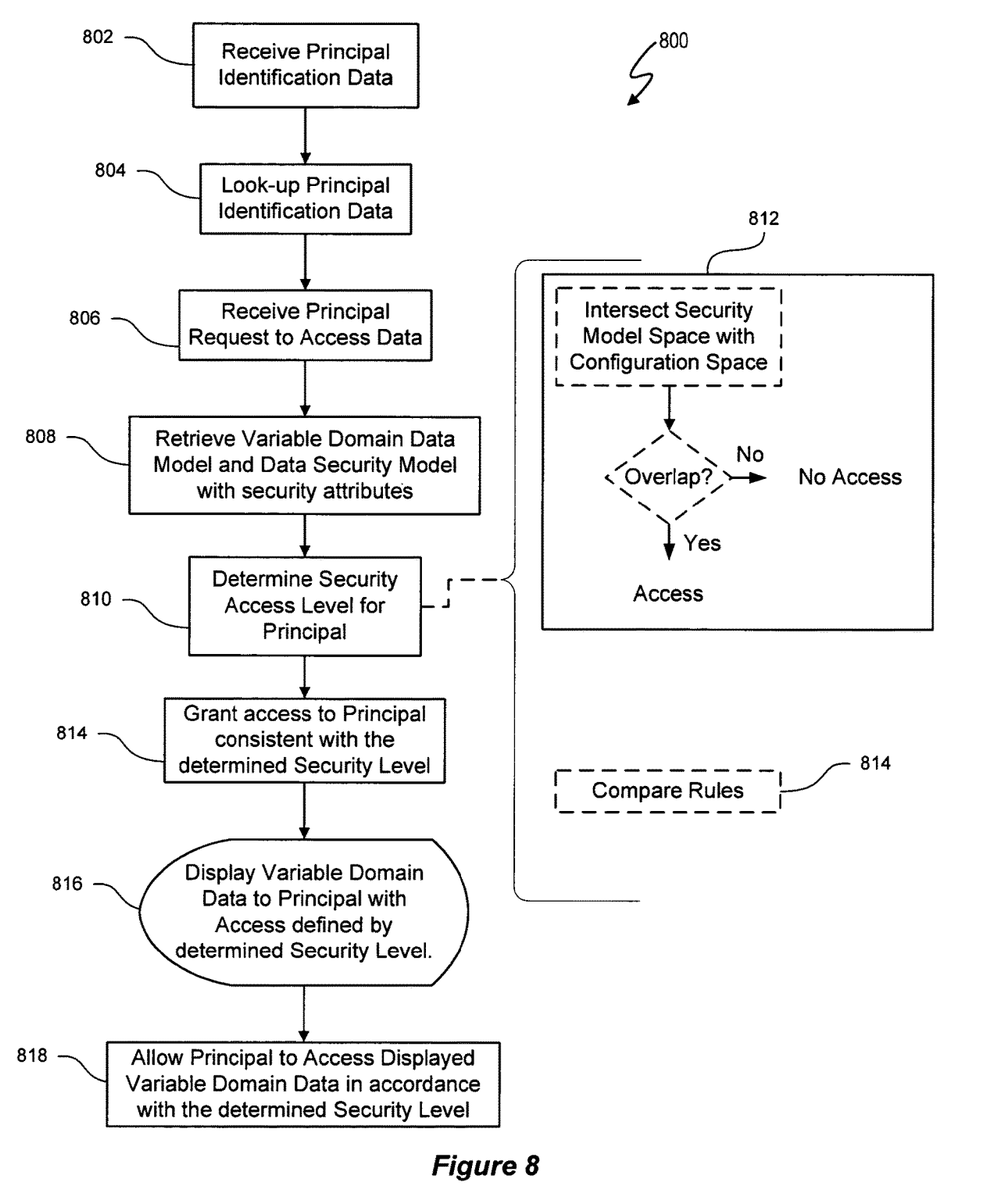
FIG. 8 depicts a variable domain data access control method.

FIG. 5 depicts a variable domain data access control system 500 that utilizes a variable domain data access control method 800 of FIG. 8 to control access to data in a variable domain data model. The variable domain data access control system 500 and variable domain data access control method 800 utilize a data security model having the same variable domain logical relationship data structure as used by an associated variable domain data model. The data security model includes security resources such as security attributes and/or rules that can be processed in the same way as attributes in a variable domain data model are processed. The security resources in the data security model allow the data security model to define data access to an associated variable domain data model. In one embodiment, a data security model is associated with a variable domain data model when the data security model is used to control access by principals to the variable domain data model. The variable domain data access control system 500 and method 800 is described below in terms of particular data. However, the variable domain data access control system 500 and method 800 can be used with any data.

The data access control business logic 102 represents an example desired access control to the data in configuration model 104. The data security model 502 is defined using the same variable domain logical relationship data structure including the same logical relationship expressions, such as a logical relationship language such as a Boolean language, used to define the associated configuration model 104. Configuration model 104 represents one embodiment of a variable domain data model. The logical relationship data structure of configuration model 104 includes a Part or Parts and Rules and/or Attributes to relate each Part to another Part or Part Combination. The logical relationship data structure of data security model 502 is the same as the configuration logic structure of configuration model 104.

Thus, since the logical relationship data structure of data security model 502 is the same as the logical relationship data structure of configuration model 104, the data security model 502 is compatible with all operations of a variable domain processing engine available for processing the configuration model 104. Thus, a configuration engine such as the configuration engine of FIG. 3 can then process user input selection data in accordance with the configuration model 104 to determine valid product configurations. For example, if a user selects Part F1, the user could also select parts A1 and B1 or A2. However, a user could not select a product with part A2. Likewise, the configuration engine can process data security model 502 to so that Principal P1 can edit data containing parts F1 and B1, and Principal P2 can edit data containing parts F1, A2, and B2. However, the actual data accessible to Principals P1 and P2 should be consistent with the relationships between data defined by the configuration model 104. Example configuration model operations when representing the configuration model as a trie are disclosed in U.S. patent application Ser. No. 10/404,891, entitled "Configuration Model Consistency Checking Using Flexible Rule Space Subsets", inventor Shawn A. P. Smith, and assigned to Trilogy Development Group, Inc.

The ACL 504 provides an equivalent representation of the security model 502. ACL 504 also demonstrates that data security model 502 reflects the desired business logic 102.

Figure 6:
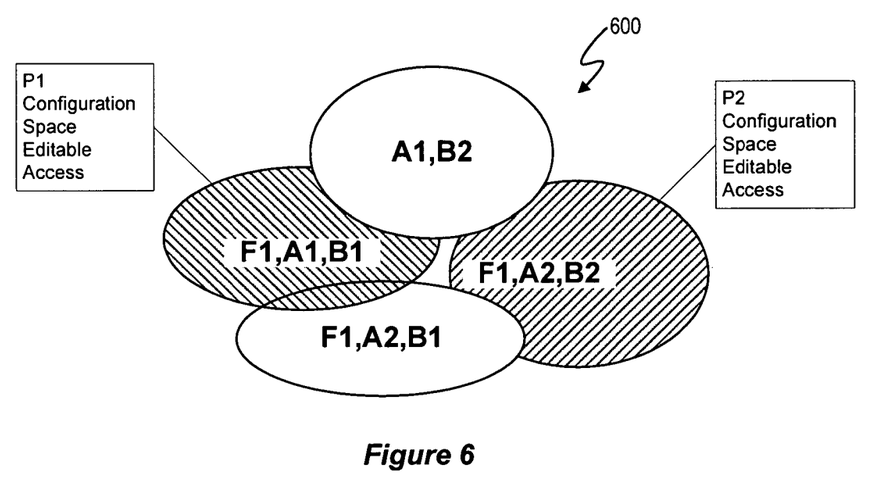
FIG. 6 depicts configuration spaces correlating to an intersection of a configuration model and data security model.

FIG. 6 depicts configuration space 600 correlating to an intersection of configuration model 104 and data security model 502. A configuration space is a type of variable domain. The configuration space is a representation of the part combinations described by attributes and/or rules. The intersection can be determined using a configuration engine by determining a cross-product between the configuration model 104 and data security model 502. The configuration spaces can be N-dimensional, but for convenience of representation, the configuration spaces are represented in 2-dimensions, where N is an integer representing the depth of data in the configuration and data security models. The intersection of configuration model 104 with data security model 502 results in the determination of the access scheme to the configuration model data for Principals 1 and 2. Principal P1 has a level of access that allows P1 to edit the P1 Editable Configuration Space, and Principal P2 has a level of access that allows P1 to edit the P1 Editable Configuration Space.

The scope of the data security model and the variable domain data model can be scaled to accommodate any amount of data, including resource data, parts, and principals, and accommodate virtually any data access control scheme. Additionally, any type of security attribute can be included in the data security model. For example, in addition to an "edit" security attribute other security attributes can be used alone or in combination with other security attributes. For example, a "view" security attribute could be used to enable or restrict view access to data. A "delete" security attribute could be used to enable or restrict complete deletion of data.

Figure 7:
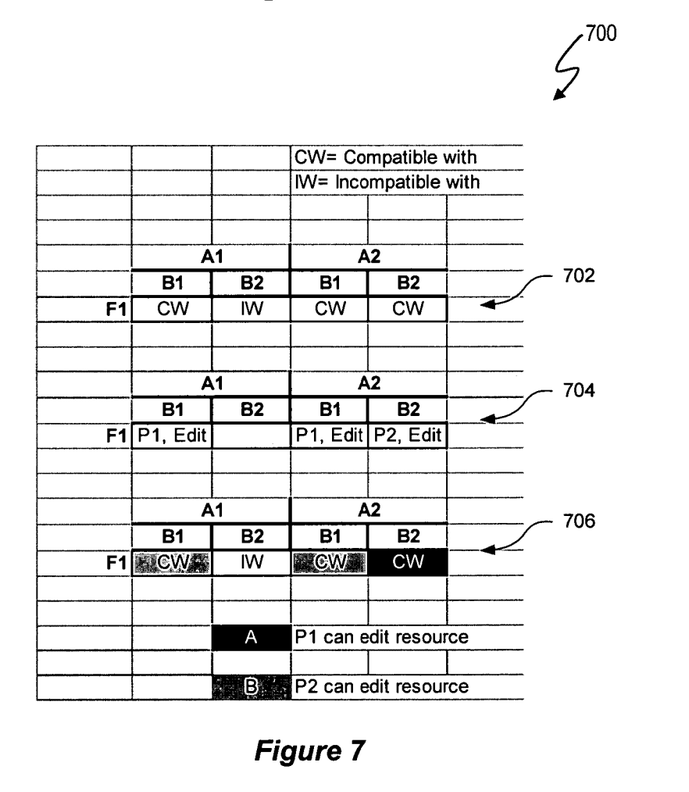
FIG. 7 depicts a user interface that allows a principal to visualize the variable domain and the controlled access to variable domain data.

FIG. 7 depicts an example user interface 700 that allows a principal such as a human user to visualize the variable domain and the controlled access to variable domain data. Display grid 702 visually depicts configuration model 104 and indicates that for the families A and B, part F1 is compatible with configurable entities (such as products) having part combinations {A1,B1}, {A2,B1}, and {A2,B2}. Part F1 is incompatible with part combinations {A1,B2}. Accordingly, the variable domain controlled display grid 706 should not allow a principal access to resource data associated with the set {A1,B2}. Display grid 704 visually depicts data security model 502 and indicates that principal P1 has 'edit' security access to configurable entities having part combinations {A1,B1} and {A2,B1}. Display grid 704 also indicates that P2 has 'edit' security access to configurable entities having part combinations {A2,B2}.

The variable domain controlled display grid 706 represents the intersection between configuration 104 and data security model 502. As discussed above, the intersection can be accomplished with a variety of configuration applications including configuration applications available from Trilogy Development Group, Inc. of Austin, Tex. Thus, variable domain security is implemented in a scalable and maintainable manner without architectural changes to a configuration model.

FIG. 8 depicts the variable domain data access control method 800 that controls access by a principal to data, such as resource data, of a variable domain. The variable domain data access control method 800 can be implemented using software executing on a data processing system. Operation 802 receives identification data from a principal. The identification data can be received through a process such as a system log-in. Operation 804 performs a look-up of the identification data to confirm the principal's access rights to the system. Operation 804 receives a request sent by the principal to access data in a variable domain. The principal may, for example, be responsible for maintaining data in portion of a variable domain data model such as a product configuration model. To comply with the received request, operation 808 retrieves the variable domain data model and a data security model having security attributes.

Operation 810 determines the security access level (i.e. the scope of security access) to grant the requesting principal. Configuration space intersection process 812 represents one embodiment of operation 810. Configuration space intersection process 812 performs an intersection operation between a data security model configuration space and the configuration model configuration space in, for example, the manner previously described. Where the configuration and security model configuration spaces overlap, the principal will be granted a level of access to the data. The principal will be denied the level of access to the data where no overlap exists. In the embodiment of FIG. 7, each principal is granted viewing access by default but only granted editing access in accordance with data security model 502. In another embodiment, compare rules operation 814 represents an embodiment of operation 810. In operation 814, rules in the variable domain data model and the data security model are compared against each other to identify data that should be accessible to the principal.

Operation 816 grants the requesting principal access to the variable domain data in accordance with the security access level determined by operation 810. Operation 816 displays variable domain data, such as resource data, to the requesting principal in accordance with the determined security access level. Operation 818 allows the principal to access the displayed variable domain data in accordance with the granted security access level.

Figure 9:
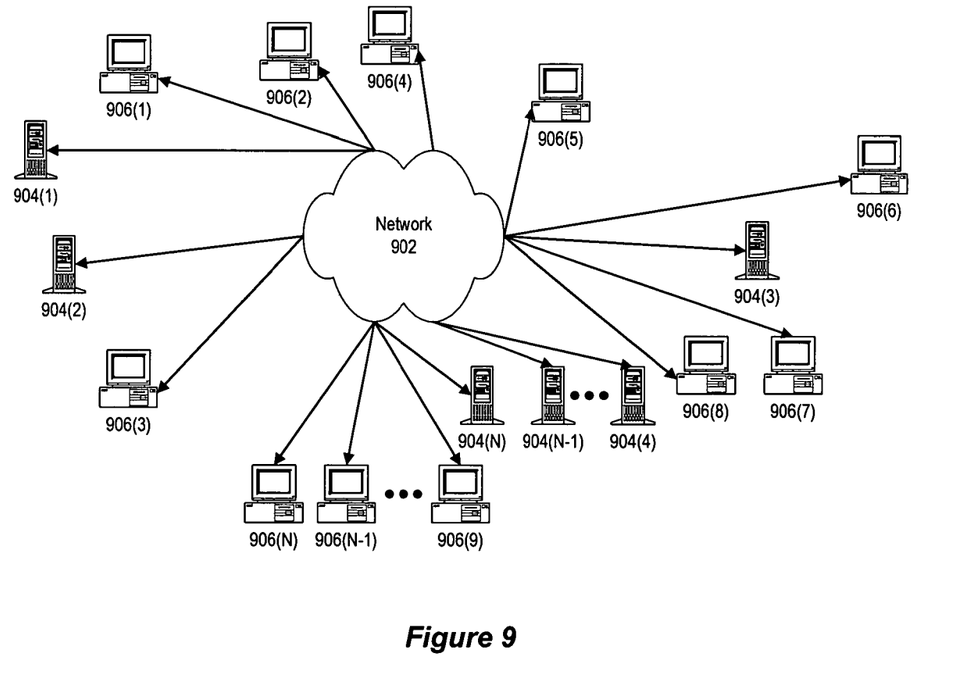
FIG. 9 depicts a block diagram illustrating a network environment in which the system and process of FIGS. 5 and 8 may be practiced.

FIG. 9 depicts a block diagram illustrating a network environment in which a variable domain data access control system 500 and variable domain data access control method 800 may be practiced. Network 902 (e.g. a private wide area network (WAN) or the Internet) includes a number of networked server computer systems 904(1)-(N) that are accessible by client computer systems 906(1)-(N), where N is the number of server computer systems connected to the network. Communication between client computer systems 906(1)-(N) and server computer systems 904(1)-(N) typically occurs over a network, such as a public switched telephone network over asynchronous digital subscriber line (ADSL) telephone lines or high-bandwidth trunks, for example communications channels providing T1 or OC3 service. Client computer systems 906(1)-(N) typically access server computer systems 904(1)-(N) through a service provider, such as an internet service provider ("ISP") by executing application specific software, commonly referred to as a browser, on one of client computer systems 906(1)-(N).

Client computer systems 906(1)-(N) and/or server computer systems 904(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more principals, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 10.

Figure 10:
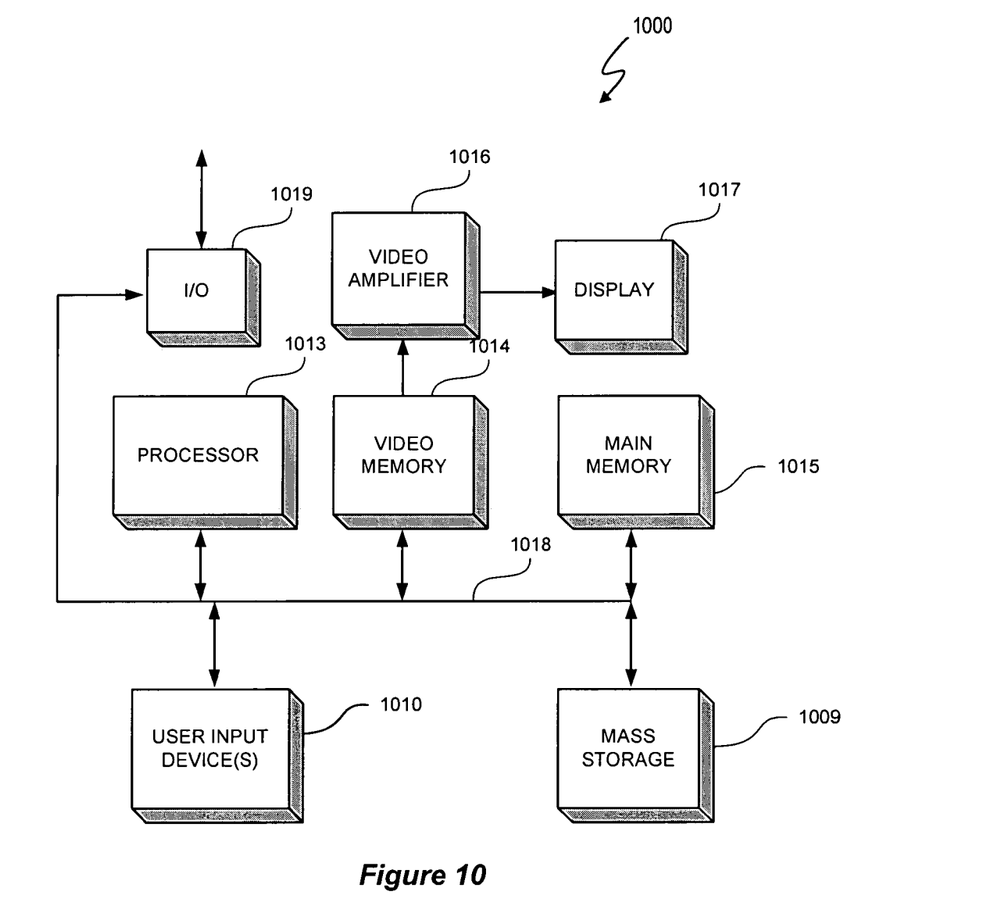
FIG. 10 depicts an example data processing system used in the network of FIG. 9.

Embodiments of variable domain data access control system 500 and variable domain data access control method 800 can be implemented on a computer system such as a general-purpose computer 1000 illustrated in FIG. 10. Input principal device(s) 1010, such as a keyboard and/or mouse, are coupled to a bi-directional system bus 1018. The input principal device(s) 1010 are for introducing principal input to the computer system and communicating that principal input to processor 1013. The computer system of FIG. 10 generally also includes a video memory 1014, main memory 1015 and mass storage 1009, all coupled to bi-directional system bus 1018 along with input principal device(s) 1010 and processor 1013. The mass storage 1009 may include both fixed and removable media, such as other available mass storage technology. Bus 1018 may contain, for example, 32 address lines for addressing video memory 1014 or main memory 1015. The system bus 1018 also includes, for example, an n-bit data bus for transferring DATA between and among the components, such as CPU 1009, main memory 1015, video memory 1014 and mass storage 1009, where "n" is, for example, 32 or 64. Alternatively, multiplex data/address lines may be used instead of separate data and address lines.

I/O device(s) 1019 may provide connections to peripheral devices, such as a printer, and may also provide a direct connection to remote server computer systems via a telephone link or to the Internet via an ISP. I/O device(s) 1019 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1009 until loaded into main memory 1015 for execution. Computer programs may also be in the form of electronic signals modulated in accordance with the computer program and data communication technology when transferred via a network.

The processor 1013, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the display 1017. Video amplifier 1016 is well known in the art and may be implemented by any suitable means. This circuitry converts pixel DATA stored in video memory 1014 to a raster signal suitable for use by display 1017. Display 1017 is a type of monitor suitable for displaying graphic images.

The computer system described above is for purposes of example only. The variable domain data access control system 500 and variable domain data access control method 800 may be implemented in any type of computer system or programming or processing environment. It is contemplated that the variable domain data access control system 500 and variable domain data access control method 800 might be run on a stand-alone computer system, such as the one described above. The variable domain data access control system 500 and variable domain data access control method 800 might also be run from a server computer systems system that can be accessed by a plurality of client computer systems interconnected over an intranet network. Finally, the variable domain data access control system 500 and variable domain data access control method 800 may be nm from a server computer system that is accessible to clients over the Internet.

Many embodiments of the present invention have application to a wide range of industries and products including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

Although the present invention has been described in detail, it should be understood that various changes, substitutions and alterations can be made hereto without departing from the spirit and scope of the invention as defined by the appended claims.

What is claimed is:

1. A method of controlled, electronic access to variable domain data, stored in a data processing system, the method comprising:
performing by a processor of a computer system of a principal programmed with code stored in a memory coupled to the processor of the computer system and executing the code by the processor of the computer system to perform operations comprising:
providing information that includes information identifying the principal; and
receiving principal access via the computer system of the principal to resource data in accordance with a level of resource data access to be granted to the principal, wherein the principal comprises an entity that has controlled access to the resource data, wherein the data processing system grants the principal access by executing code by a processor of the data processing system to perform operations comprising:
receiving the information from the computer system of the principal that includes the information identifying the principal;
accessing at least the information identifying the principal;
accessing a data security model and a variable domain data model from a memory coupled to the processor of the data processing system;
performing one or more logical relationship operations on the data security model and the variable domain data model using security attributes of the data security model to determine the level of resource data access to be granted to the principal, wherein:
the variable domain data model comprises data elements in an on-line analytical processing (OLAP) data hyper-cube;
performing the one or more logical operations comprises performing an intersection between configuration spaces defined by the data security model and the variable domain data model;
data included in any overlap of the configuration spaces is used to determine the level of resource data access to be granted to the principal;
the configuration spaces are representations of combinations of parts of a system; and
the combinations of the parts are described by attributes of the parts and configuration relationships between the parts;
and
providing the principal access by at least granting the principal access via the computer system of the principal to the resource data in accordance with the level of resource data access to be granted to the principal, wherein the principal comprises an entity that has controlled access to the resource data.

2. The method of claim 1 wherein the data security model comprises an access control list that include security attributes as resource data and uses a same data structure and logical relationship expressions as the variable domain data model.

3. The method of claim 2 wherein resource data, attributes, and logical relationships are included in the variable domain data model and performing the one or more logical relationship operations on the data security model and the variable domain data model using security attributes of the data security model to determine the level of resource data access to be granted to the principal comprises:
executing a configuration engine to perform the intersection between the configuration spaces defined by the data security model and the variable domain data model, wherein data included in any overlap of the configuration spaces is used to determine the level of resource data access to be granted to the principal.

4. The method of claim 3 wherein executing the configuration engine to perform the intersection between the configuration spaces comprises:
determine cross-products between the data security model and the variable domain data model.

5. The method of claim 1 wherein the data security model and the variable domain data model share a common logical relationship data structure and the relationship data structure includes infra-model data, interrelationships defined using Boolean logic.

6. The method of claim 1 wherein the level of resource data access granted to the principal comprises rights to view the resource data.

7. The method of claim 1 wherein the level of resource data access granted to the principal comprises rights to modify at least one member of the group consisting of: the resource data, variable domain data model attributes, and logical relationships used to describe the resource data.

8. The method of claim 1 further comprising:
providing display data to allow the resource data to be displayed on an electronic monitor, wherein a display of the resource data includes an indication of the level of resource data access granted to the principal.

9. The method of claim 8 wherein the display data provided to allow the resource data to be displayed on the electronic monitor comprises data to allow the resource data to be displayed in a grid framework, wherein resource data for which a level of resource data access has been granted to the principal are visually distinguishable from resource data for which a level of resource data access has not been granted to the principal.

10. The method of claim 1 further comprising:
processing resource data of the variable domain data model with a plurality of algorithms; and
processing the data security model also using the plurality of algorithms used to process the resource data of the variable domain data model.

* * * * *